United States Patent [19]
Youens

[11] Patent Number: 5,921,620
[45] Date of Patent: Jul. 13, 1999

[54] HEADLINER RETAINER

[76] Inventor: Robert M. Youens, 16480 County Road #3, Fairhope, Ala. 36532

[21] Appl. No.: 08/788,992

[22] Filed: Jan. 27, 1997

[51] Int. Cl.⁶ .................................................. B60R 13/02
[52] U.S. Cl. .......................................... 296/214; 24/600.9
[58] Field of Search .................................... 296/214, 39.1, 296/39.3; 24/600.9, 716; 52/53, 506.05, 511, 512, 716.3, 716.4

[56] References Cited

U.S. PATENT DOCUMENTS

| | | | |
|---|---|---|---|
| 2,001,136 | 5/1935 | Holderbach | 160/354 |
| 2,194,902 | 3/1940 | Heuer | 72/333 |
| 2,879,105 | 3/1959 | Stahl | 296/214 |
| 3,203,730 | 8/1965 | Chupick | 296/214 |
| 3,393,006 | 7/1968 | Resch et al. | 296/214 |
| 3,876,246 | 4/1975 | Lutz et al. | 296/214 |
| 4,971,388 | 11/1990 | Knaggs | 296/214 |
| 5,449,032 | 9/1995 | Blevins et al. | 160/80 |

*Primary Examiner*—Andrew C. Pike
*Attorney, Agent, or Firm*—Keaty & Keaty

[57] ABSTRACT

A retainer for horizontally suspended flexible material, such a headliner of a car, has an elongated support bar and one or more retainer pins engaged within one or more openings formed in the support bar. Each of the retainer pins has an arcuate portion with a sharp end that is adapted to penetrate through the flexible material and move the arcuate portion in a hook-like manner into engagement with the suspended flexible material. The support bar which has been securely engaged with the pins is moved into contact with the outer surface of the flexible material, preventing it from sagging and retaining it in a generally taut position.

20 Claims, 4 Drawing Sheets

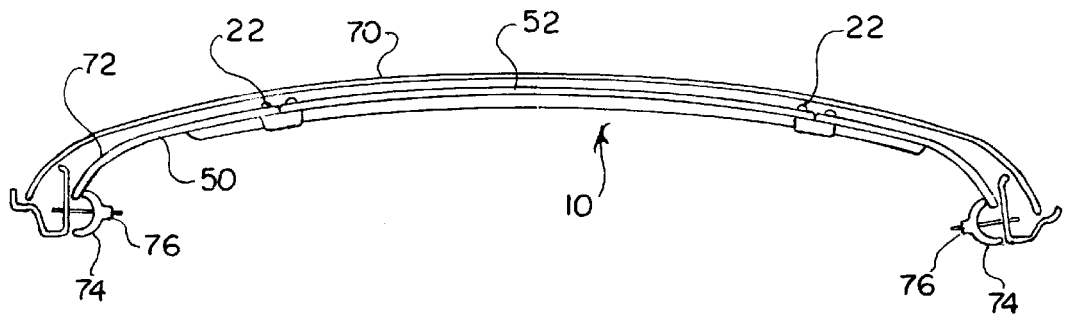
F I G . 2
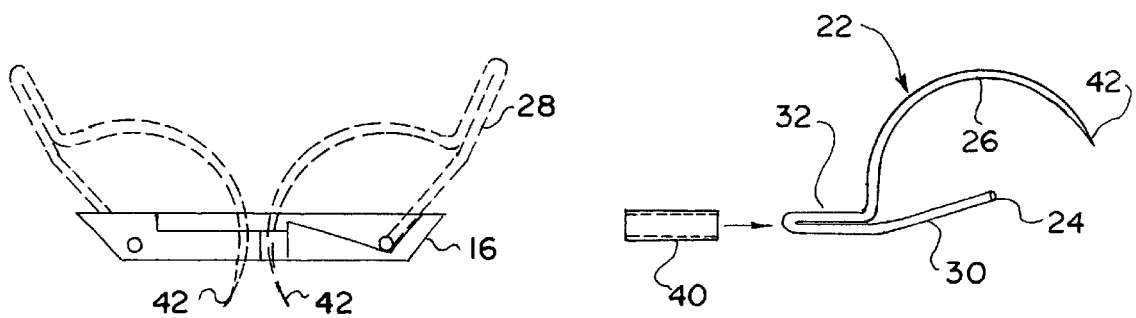
F I G . 4
F I G . 5
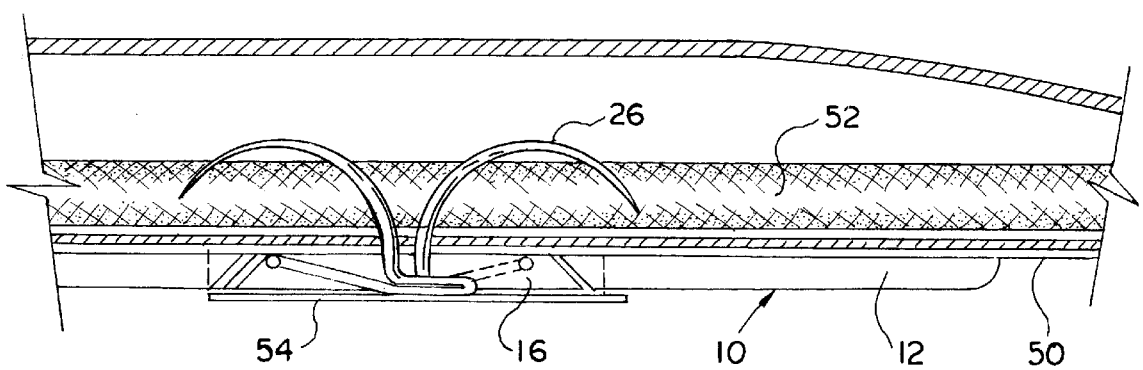
F I G . 6

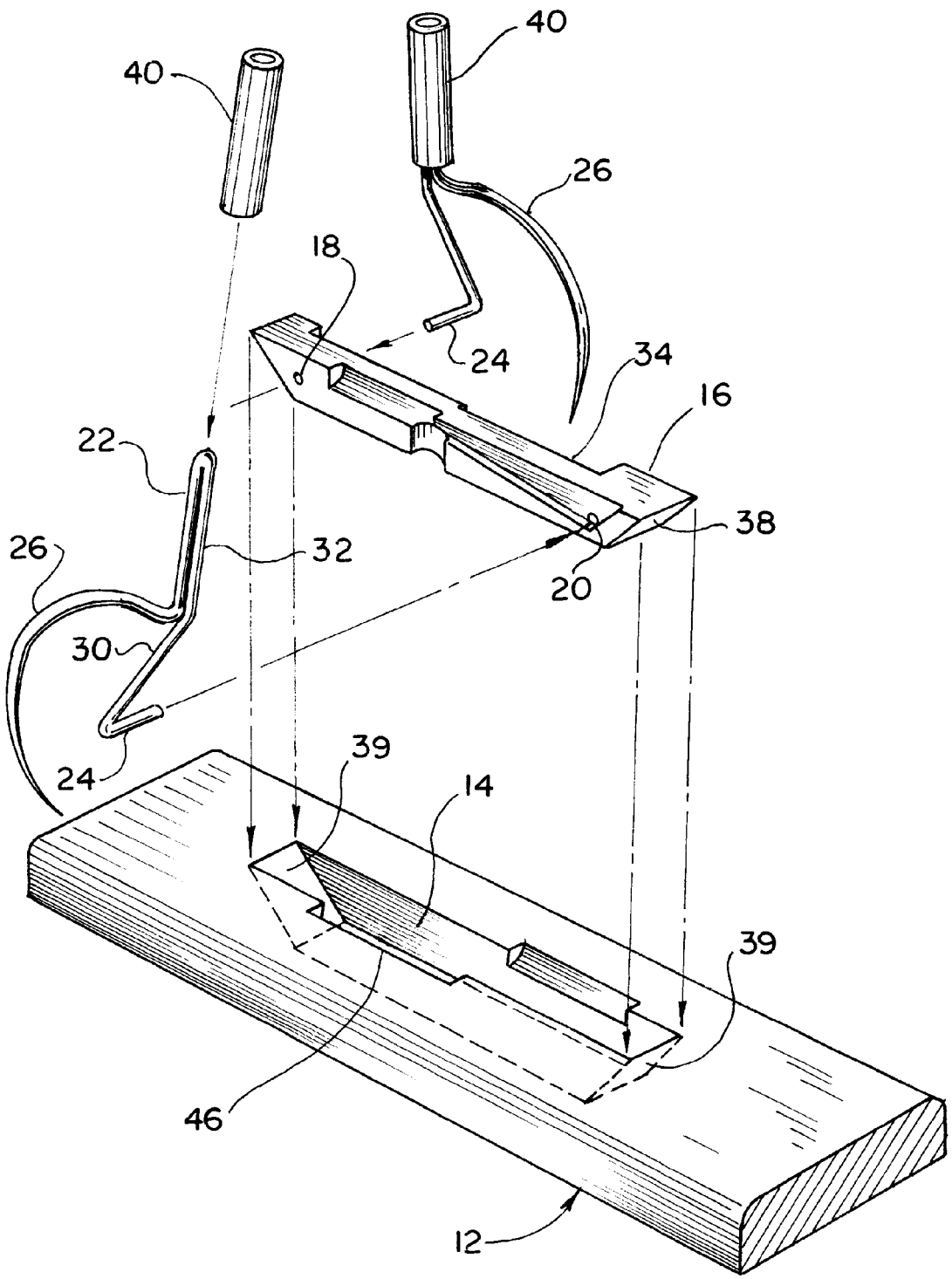
F I G. 3

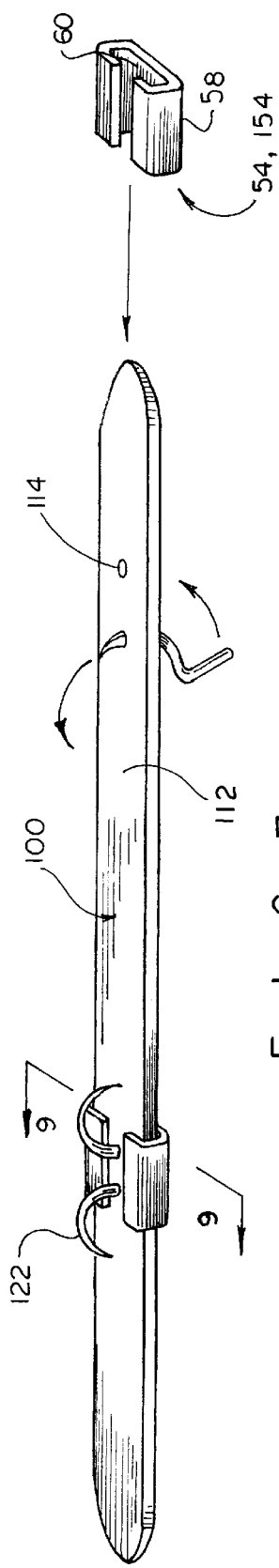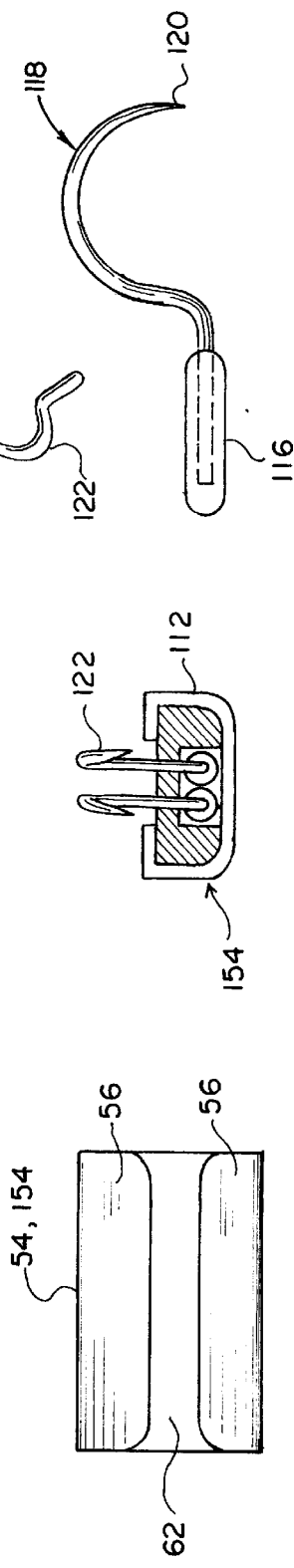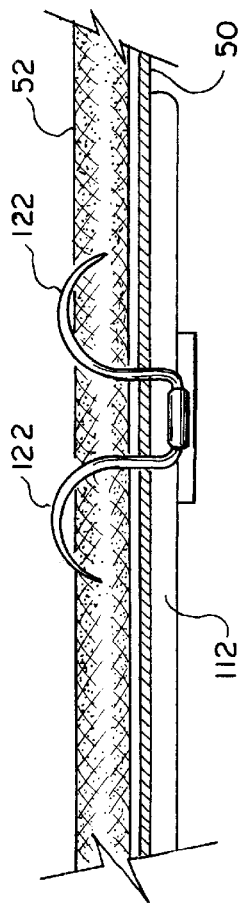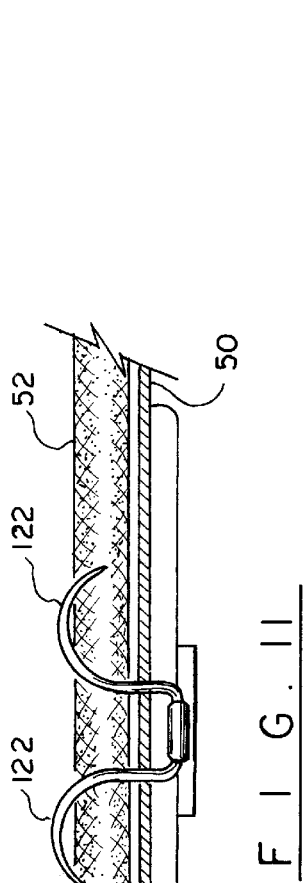

HEADLINER RETAINER

BACKGROUND OF THE INVENTION

This invention relates to a retainer for horizontally suspended flexible material, and more particularly to a retainer for automobile headliner.

It is conventional in the automobile industry to construct the ceiling of a car cab from a flexible material which covers completely the interior metal roof of a vehicle. The headliner is usually preformed by molding from different materials. A multilayered headliner has a fiber backing which forms the innermost layer that faces the metal roof of the car. A fabric material in a color complimentary to the interior of the car forms the outermost layer of the headliner. A bonding agent, for example a foam adhesive, is deposited between the fabric and the fiber backing in order to retain the fabric material in a substantially parallel relationship to the fiber backing and form a smooth interior ceiling of the car.

In time, the foam adhesive tends to deteriorate which results in disengagement of the fabric layer from the fiber backing. The ceiling of the car loses its aesthetic appearance as the fabric layer sags down from the ceiling. As a general rule, professional repair services are required to correct the defect, the repair services being sometimes prohibitively expensive.

To solve the problem, the present invention contemplates provision of a mechanical means for retaining a horizontally suspended fabric layer of a headliner, or other horizontally suspended flexible material in a taught position in relation to the inner layer backing.

SUMMARY OF THE INVENTION

It is, therefore, an object of the present invention to provide a retainer device for horizontally suspended flexible material.

It is a more specific object of the present invention to provide a headliner retainer for an interior of an automobile, or other similar vehicle.

It is another object of the present invention to provide a mechanical means for engaging a flexible layer of fabric to an inner backing, which is simple to use and inexpensive to manufacture.

It is a further object of the present invention to provide a headliner retainer which can be easily installed by nonprofessionals to correct a defect of sagging fabric of a headliner.

These and other objects of the present invention are achieved through a provision of a device for retaining a horizontally suspended flexible material, for example headliner of a car, which comprises an elongated support bar provided with one or more openings extending therethrough. A retainer pin is removably received within each of the openings in the support bar, the number of retainer pins varying depending on the weight of the support bar and the length thereof. Each retainer pin has an arcuate portion with a sharp end which is adapted to penetrate through the flexible material and allow the arcuate portion to move through the flexible material, securing the retainer pin in a "hook-like" manner with the flexible material. The support bar which is firmly engaged with the pin is moved into contact with the flexible material, preventing the flexible material from sagging and keeping it in a relatively taught position.

The size of the arcuate portion of each of the retainer pins is arbitrary and largely depends on the thickness of the flexible material or the headliner of a car. It is preferred that the arcuate portion be large enough to allow the sharp end of the arcuate portion to re-enter the flexible material from the surface opposite to the surface of the initial entry. It is believed that such an arrangement facilitates a more secure engagement of the support bar with the flexible material.

One of the embodiments of the retainer device of the present invention utilizes a retainer pin having a sickle-shaped configuration. Another embodiment of the present invention utilizes a retainer pin which is provided with a first end, a second arcuate end, and a middle portion. The first end of the pin in accordance with this embodiment extends in a plane perpendicular to a normal plane of the arcuate portion and the middle portion.

One of the embodiments of the present invention provides for the retainer pins to engage with the support bar directly, while another embodiment provides for the use of an insert block fitted into a cutout formed in the support bar. The insert carries the retainer pins in a pivotal engagement therewith. Suitable grooves and shoulders of the insert element allow to accommodate the handle, or the gripping portion of the retainer pins when the pins are pivoted to engage with the flexible material.

An optional sliding lock is provided for fitting over the support bar and the handle portions of the pins to cover the exposed surfaces of the pins and form a more uniform appearance on the outermost surface of the support bar.

BRIEF DESCRIPTION OF THE DRAWINGS

Reference will now be made to the drawings, wherein like parts are designated by like numerals, and wherein

FIG. 2 is a schematic view showing position of a headliner retainer of the present invention and a roof structure of an automobile.

FIG. 3 is a detail exploded view showing an insert block with headliner retainer pins of the first embodiment of the present invention.

FIG. 4 is a detail side view of the insert block, with pins engaged in the insert block shown in phantom lines.

FIG. 5 is a detail view showing a retainer pin of the first embodiment of the present invention.

FIG. 6 is a cross-sectional view showing a portion of a headliner retainer of the first embodiment installed in the ceiling of a car.

FIG. 7 is a perspective view of a support bar with a sliding lock of the second embodiment.

FIG. 8 is a plan view of a sliding lock utilized in the apparatus of the present invention.

FIG. 9 is cross-sectional view taken along lines 9—9 of FIG. 7.

FIG. 10 is a detail view of a retainer pin of the second embodiment of the present invention.

FIG. 11 is a cross-sectional view showing a portion of a headliner retainer of the second embodiment installed in the ceiling of a car.

DETAIL DESCRIPTION OF THE PREFERRED EMBODIMENT

Figure 1:
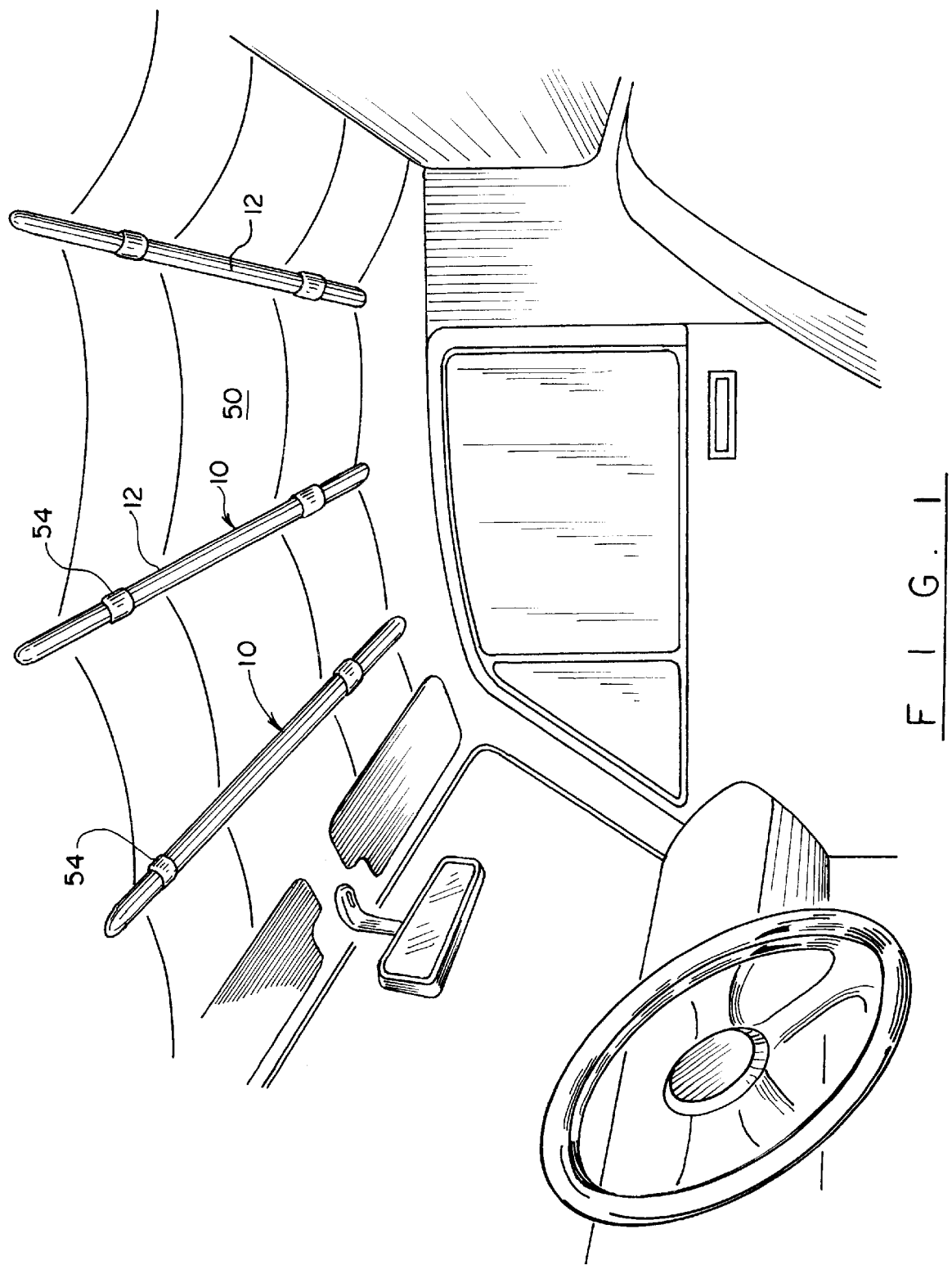
FIG. 1 is a perspective detail view showing a number of headliner retainers installed in a cab of an automobile.

Turning now to the drawings in more detail, numeral 10 designates a headliner retainer unit in accordance with the present invention. The retainer unit 10 comprises an elongated retainer support bar 12 of a discrete length suitable for extending across the interior ceiling of a car or other vehicle in a direction generally perpendicular to a longitudinal axis of a car.

A plurality of units 10 can be used, the units 10 being spaced from each other, as shown in FIG. 1, to a distance suitable for retaining the flexible material lining in a relatively taught position. As can be seen in FIG. 2, a fabric layer 50 is pushed upwardly by the retainer 10, to move the layer 50 into contact with a fiber backing 52.

Turning now to FIG. 3, a detail view of the first embodiment of the present invention is illustrated. As can be seen in the drawings, the elongated support bar 12 is provided with a cutout 14 which has a truncated shape and can be rectangular, square, oval, and the like. An insert block 16 is adapted to fit into the cutout 14 and be retained within the cutout 14 in a frictional engagement with the support bar 12.

If desired, the insert block 16 can be made from a flexible material that will allow the insert block 16 to snap into the cutout 14, thereby ensuring its fitted engagement with the support bar 12. Of course, the insert 16 can be injection molded into the support bar 12, or can be retained in the cutout 14 by adhesive, hot glue or other suitable means.

The insert block 16 is provided with a pair of openings 18 and 20, each adapted to receive one end of a retainer pin 22 therein. Each retainer pin 22 has a first end 24 which is sized and shaped to fit into a respective opening 18 or 20, and a second end 26 which is arcuately shaped and extends along a plane generally perpendicular to the normal plane of the first end 24.

A handle portion 28 is formed between the first end 24 and the second end 26, the handle 28 being formed by an intermediate part of the pin 22 folded in a U-shape, as shown in FIGS. 2–4. The handle portion 28 is comprised of two parts. The first part 30 is unitary connected to the first end 24 at a right angle. The second part 32 extends at an obtuse angle to the first part 30 and is formed by a folded over middle portion of the pin body 22. The second end 26, the first part 30, and the second part 32 of the pin 22 extend along substantially the same plane, while the first end 24 extends perpendicularly to that plane.

If desired, an optional tubular sleeve 40 can be slipped over the second part 32, substantially covering the second part 32 (see FIG. 5). The sleeve 40 makes it easier for the user to grip the handle portion 28 when the pins 22 are rotated or pivoted, as will be explained in more detail hereinafter.

When the first ends 24 of the pins 22 are inserted into the respective openings 18 and 20, the insert block 16 is moved into a frictional engagement with the support bar 12 fitting into the cutout 14, with the pins 22 extending outwardly. If desired, the insert block 16 can be provided with one or more preformed grooves, such as groove 34, and shoulders, such as shoulder 36, which correspond to shoulders and grooves defined by the cutout 14. The grooves and shoulders are adapted to facilitate secure engagement of the insert block 16 within the cutout 14. Additionally, the end walls 38 of the insert block 16 can be beveled, and corresponding bevel walls 39 can be made in the cutout 14 to accommodate the shape of the insert block 16. The bevel walls prevent disengagement of the insert block 16 from the support bar 12.

Once the pins 22 are engaged with the insert block 16, the second arcuate ends 26 of the pins 22 become directed towards each other, although sharp ends 42 become oriented in opposite directions, as can be better seen in FIG. 6.

Once in place, the retainer pins 22 are pivoted about the axis of the first end 24, causing the sharp ends 42 to puncture and penetrate through the flexible outer layer 50, into the backing material 52 of a headliner. The arcuate second ends 26 of the pins 22 are of sufficient dimension to extend through the thickness of the backing material and to cause the sharp ends 42 of the pins 22 to reenter the backing a distance from the original entry surface. As will be appreciated by those skilled in the art, that distance can be regulated by suitably sizing the arcuate ends 26 of the pins 22.

Once the pins 22 become firmly engaged with the headliner of a car, the support bars 12 move into contact with the outer surface of the flexible material 50, causing the fabric material to realign itself with the backing 52 in a relatively taught engagement. As shown in FIG. 2, the backing 52 extends a distance below a metal roof 70 of a car, and the retainer pins 22 fit within a space formed between the inside surface of the roof 70 and an inner surface 72 of the backing 52. As a result, there is no damage to the roof 70 when the retainer 10 is used.

The headliner is usually attached to the roof 70 by suitable securing means, such as for example trim bracket 74 and a bolt, or screw 76. The support bar 12, being an independently securable structure, does not rely on the automobile rigid structural elements for its suspension on the headliner per se. As a result, no structural changes to the car's frame are necessary when the present invention is used.

The sleeves 40 of the pins 22 are adapted to fit into grooves 34 formed in the insert block 16, when the pins 32 are pivoted for engagement with the headliner. If necessary, a corresponding groove 46 can be formed in the wall of the cutout 14 to accommodate the thickness of the sleeve 40.

An optional lock element 54, is provided for sliding over the insert block 16, completely covering the insert block 16 and making the outward appearance of the headliner retainer 10 uniform. The locking slide 54 has a generally U-shaped cross section and can be formed from a single sheet of plastic or metal, depending on the material of the headliner retainer.

The lock element 54, as shown in FIGS. 7 and 8, is provided with a pair of inwardly extending flanges 56 of sufficient width to extend inwardly from the side walls 58 of the sliding lock 54, leaving a channel 60 formed by the lock element 54 open on top. The sliding lock 54 is moved into engagement with the support bar 12, as shown in FIGS. 6 and 7, with the bottom wall 62 of the sliding lock 54 engaging the outermost surface of the support bar 12 and covering the handles 28 and sleeves 40 of the pins 22 and presenting a more uniform appearance to the retainer unit 10.

As shown in FIG. 6, the sliding lock 54 encloses the outermost surface of the support bar 12, the grip portions, and the sleeves 40.

The second embodiment of the present invention 100 utilizes retainer pins engageable directly with a support bar 112. As shown in FIG. 7, one or more pins 122 are engaged within apertures 114 formed in the support bar 112.

The retainer pins 122 of the second embodiment are shaped as a sickle and comprise a handle portion 116 and an arcuate portion 118. After the pins 122 are inserted into the apertures 114, they are rotated, such that the sharp ends 120 of each of the pins 122 are directed downwardly, to the support bar 112, which allows the arcuate portions 118 to enter the headliner material at one point, and re-enter the headliner material, on the inner surface thereof, and penetrate to some degree. Such an arrangement makes the position of the support bar 112 more secure in relation to the headliner.

An optional locking slide 154 (see FIG. 9), similar to the locking slide 54 shown in FIGS. 7 and 8, is provided to cover the handle portions 116 of the retainer unit and form a uniform appearance on the exterior of the headliner retainer when it is positioned in a car cabin.

The second embodiment of the present invention utilizes no insert blocks, and consequently is less expensive to manufacture. It should be noted, however, that installation of the second embodiment may be slightly more time consuming than installation of the headliner retainer according to the first embodiment of the present invention. The headliner retainer of the first embodiment can be pre-manufactured and assembled at a factory, so that the consumer receives a unit ready for installation on a car or in other applications, where support of horizontally suspended flexible material is necessary.

The size of the second portions 26 and 118, of the retainer pins 22 and 122, respectively, is arbitrary and depends on the thickness of the headliner material utilized in a particular vehicle or in other applications. The size of the second portion, however, should not be so great as to cause the sharp point of the retainer pins to scratch the roof of the car or otherwise damage the interior.

The retainer unit of the present invention can be manufactured from aluminum, plastic, by injection molding, pressing, and by other suitable methods. Each headliner retainer unit is lightweight, so as not to pull the headliner layer away from its position on the ceiling of a car. The pins 22 and 122 can be made of plastic, metal, or other suitable material, and have a diameter to minimize damage to the headliner.

The present invention can utilize one or more retainer pin for securing the support bar to the presently suspended flexible material. The number of retainer pins depends on the weight of the support bar, the length of the support bar, as well as the material utilized for the retainer unit. If more than one pin is used for the support bar, it is preferred that the pins are spaced so as to balance the weight of the support bar when positioned on the headliner.

The openings which receive the pins need not be aligned, but can be formed in a staggered manner in the support bar, thereby ensuring a more secure engagement of the support bar with the headliner. The headliner retainer device of the present invention clamps to the flexible lining without the need to be attached to the rigid structure of the automobile, thereby requiring no alterations in the existing automobile frame.

Many changes and modifications to the present invention will become apparent to those skilled in the art. I, therefore, pray that my rights to the present invention be limited only by the scope of the appended claims.

I claim:

1. A device for retaining horizontally suspended flexible material, said device comprising:
    an elongated support bar provided with at least one opening extending therethrough; and
    at least one retainer pin removably extending through said at least one opening formed in the support bar, said at least one retainer pin comprising an arcuate portion having a sharp end suitable for puncturing said flexible material to allow said arcuate portion to penetrate through said flexible material and move said support bar into a close contact with said flexible material, whereby said support bar and said at least one retainer pin are supported by said flexible material.

2. The device of claim 1, wherein said support bar is provided with a pair of spaced-apart said openings, each of said pair of spaced-apart openings receiving a corresponding said retainer pin, and wherein each of said corresponding retainer pins has the sharp end oriented away from the sharp end of an adjacent said retainer pin when the support bar is in contact with the flexible material.

3. The device of claim 1, wherein said at least one retainer pin comprises a grip portion to facilitate engagement of said at least one retainer pin with said support bar.

4. The device of claim 3, further comprising a gripping sleeve detachably mounted on said grip portion.

5. The device of claim 1, wherein said at least one retainer pin has a sickle-shaped configuration.

6. The device of claim 1, further comprising a locking element slidably detachably engageable with said support bar, said locking element preventing disengagement of said at least one retainer pin from said support bar when said locking element is moved in alignment with said at least one retainer pin.

7. The device of claim 6, wherein said locking element has a generally U-shaped cross section and a pair of inwardly extending flanges which define an open channel for receiving said support bar and at least a portion of said at least one retainer pin therein.

8. The device of claim 1, further comprising a cutout in said support bar, and is an insert element fittingly engaged within said cutout, said insert element engaging a portion of said at least one retainer pin so as to facilitate secure engagement of said at least one retainer pin with said support bar.

9. The device of claim 8, wherein said at least one retainer pin comprises a first end, a second arcuate end, and a middle portion, said middle portion forming a handle part, and wherein said first end is adapted for engagement within an aperture formed in said insert element.

10. The device of claim 9, wherein said first end extends in a plane generally perpendicular to a normal plane of said second end and of said middle portion.

11. The device of claim 9, wherein said first end is adapted for pivotal engagement with said insert element.

12. The device of claim 9, further comprising a gripping means detachably mounted on said handle part.

13. The device of claim 8, wherein said insert element is adapted for supporting a pair of said retainer pins.

14. The device of claim 13, wherein the sharp end of each of said pair of retainer pins is oriented away from the sharp end of an adjacent said retainer pin when the support bar is positioned in contact with said flexible material.

15. A device for retaining a horizontally suspended flexible headliner of a car, said device comprising:
    an elongated support bar provided with a pair of spaced-apart openings extending through said support bar; and
    a pair of retainer pins removably extending through a corresponding said opening formed in the support bar, each of said retainer pins comprising an arcuate portion having a sharp end suitable for puncturing an outer surface of said headliner to allow said arcuate portion to penetrate through said headliner and move said support bar into a close contact with said headliner, said arcuate portion having a discrete size suitable for allowing the sharp end to re-enter the headliner from a surface opposite to the outer surface of the headliner.

16. The device of claim 15, wherein each of said retainer pins comprises a grip portion to facilitate engagement of said pin thereof with said support bar.

17. The device of claim 16, further comprising a gripping sleeve detachably engageable with a grip portion of each of said retainer pins.

18. The device of claim 15, wherein each of said retainer pins has a sickle-shaped configuration.

19. The device of claim 15, further comprising a cutout in said support bar and an insert element fittingly engaged within said cutout, said insert element engaging a portion of each of said retainer pins such that said sharp ends of said retainer pins are oriented away from each other when the support bar is moved into engagement with the headliner.

20. The device of claim 19, wherein, for each of said retainer pins, said retainer pin comprises a first end, a second arcuate end, and a middle portion, said first end being adapted for engagement within an aperture formed in said insert element, and wherein said first end extends in a plane generally perpendicular to a normal plane of said second end and of said middle portion.

* * * * *